(12) United States Patent
Zimmer et al.

(10) Patent No.: US 6,615,877 B2
(45) Date of Patent: Sep. 9, 2003

(54) FUEL LINE FOR A MOTOR VEHICLE

(75) Inventors: Werner Zimmer, Melsungen (DE); Kurt Apel, Neuenstein (DE); Thorsten Otto, Ahnatal (DE)

(73) Assignee: TI Group Automotive Systems (Fuldabruck) GmbH, Fuldabruck (DE)

( * ) Notice: Subject to any disclaimer, the term of this patent is extended or adjusted under 35 U.S.C. 154(b) by 0 days.

(21) Appl. No.: 09/867,696

(22) Filed: May 30, 2001

(65) Prior Publication Data

US 2002/0033197 A1 Mar. 21, 2002

(30) Foreign Application Priority Data

Aug. 2, 2000 (EP) .............................. 00116657

(51) Int. Cl.[7] .............................. F16L 11/04; B32B 1/08
(52) U.S. Cl. ........................ 138/137; 138/140; 138/141; 138/DIG. 7
(58) Field of Search ................................. 138/137, 140, 138/141, DIG. 7, 146; 428/36.4

(56) References Cited

U.S. PATENT DOCUMENTS

| 5,038,833 A | * | 8/1991 | Brunnnhofer | 138/125 |
| 5,076,329 A | | 12/1991 | Brunnhofer | 138/137 |
| 5,167,259 A | | 12/1992 | Brunnhofer | 138/137 |
| 5,284,184 A | * | 2/1994 | Noone et al. | 138/103 |
| 5,383,087 A | * | 1/1995 | Noone et al. | 138/137 |
| 5,390,705 A | | 2/1995 | Brunnhofer | 138/137 |
| 5,476,120 A | | 12/1995 | Brunnhofer | 138/137 |
| 5,678,611 A | * | 10/1997 | Noone et al. | 138/137 |
| 5,743,304 A | * | 4/1998 | Mitchell et al. | 138/137 |
| 5,865,218 A | * | 2/1999 | Noone et al. | 138/137 |
| 5,996,642 A | * | 12/1999 | Noone et al. | 138/137 |
| 6,090,459 A | | 7/2000 | Jadamus et al. | 428/36.4 |

FOREIGN PATENT DOCUMENTS

EP    1 002 977    5/2000

* cited by examiner

Primary Examiner—Patrick Brinson
(74) Attorney, Agent, or Firm—Herbert Dubno

(57) ABSTRACT

A multilayer tubing for conveying liquid, especially motor vehicle fuel in a motor vehicle is extruded with an outer layer composed of nylon 12, an intermediate layer composed of an ethylene vinyl alcohol copolymer and an electrically-conductive inner layer composed of nylon 6 or nylon 12 and compounded with at most 30% by weight of conductive carbon black or graphite fibril.

15 Claims, 3 Drawing Sheets

FUEL LINE FOR A MOTOR VEHICLE

FIELD OF THE INVENTION

Our present invention relates to a fuel line for a motor vehicle and, more particularly, to a layered fuel line of a coextruded type and particularly a type in which the fuel line has an outer layer of polyamide 12 (nylon 12), an intermediate layer of an ethylene-vinyl alcohol copolymer and an inner layer of a polyamide (nylon), for example polyamide 6 (nylon 6).

BACKGROUND OF THE INVENTION

German patent document DE 40 01 125 C1 describes a fuel line for a motor vehicle of the type in which the intermediate layer serves as a hydrocarbon permeation barrier and thus prevents the diffusion of hydrocarbons from the fuel to the outer layer.

The interior of the fuel line has been found, in motor vehicle applications, to become electrostatically charged to an impermissible level. In addition, the inner part of the earlier layered fuel line tubing is not resistant to $ZnCl_2$ which can form on zinc-containing and usually die-cast parts. With the earlier tubing, when it was assembled to zinc-containing fittings, damage to the tubing could occur, the aging effect was more pronounced and stress corrosion could arise.

Fuel lines of this type are also described in U.S. Pat. No. 5,076,329 which corresponds in part to DE 40 01 125 C1 and in U.S. Pat. Nos. 5,167,259, 5,390,705 and 5,476,120.

Mention may also be made of the teaching in Römpp Chemie Lexikon, Vol. 2, Georg Thieme Verlag Stuttgart, 9th Edition 1990, pages 1110 to 1113, to the effect that certain native solid polymers which are electrically nonconductive can be made conductive by the addition of certain conductive substances like, for example, carbon black or carbon fibers. The resulting electrically conductive polymers, however, are too brittle and insufficiently ductile to be used for the fabrication of coextruded layered tubing and, in particular, tubing for motor vehicle fuel lines.

OBJECTS OF THE INVENTION

It is the principal object of the present invention to provide a fuel line for the aforedescribed purposes which is capable of eliminating problems arising from electrostatic charging and a sensitivity to zinc chloride.

Another object of the invention is to provide an improved multilayer fuel piping for motor vehicles which retains its ductility and strength, does not promote corrosion or become corroded readily, even in the presence of zinc-containing fittings, and is free from drawbacks of prior art coextruded tubing.

Still another object of the invention is to provide a low-cost tubing which is resistant to damage by hydrocarbon fuels, does not suffer degradation by diffusion through the tubing and is less sensitive to zinc chloride from fittings with which the tubing is used than has hitherto been the case.

SUMMARY OF THE INVENTION

We have found that these objects can be attained when a layer of polyamide 6 constituting the inner layer has up to 30 weight percent of conductive carbon black or graphite fibrils added thereto so as to render such layer electrically conductive and zinc chloride resistant. When that inner layer is polyamide 12, it can also be rendered conductive by the addition of at most 30 weight percent conductive carbon black or graphite fibrils. In particular, the multilayer tubing for conveying a liquid, according to the invention, and especially fuel for a motor vehicle, can comprise:

an outer layer composed of nylon 12;

an intermediate layer coextruded with the outer layer and composed of an ethylene-vinyl alcohol copolymer; and an electrically conductive inner layer coextruded with the outer and intermediate layer and composed of a nylon selected from the group which consists of nylon 6 and nylon 12 and compounded with an amount effective to render the inner layer electrically conductive and at most 30 percent by weight of at least one conductive substance selected from the group which consists of conductive carbon black and graphite fibrils.

Preferably the tubing forms a motor-vehicle fuel line, the inner layer contains at least 0.1 percent by weight of the conductive substance and sufficient to improve resistance of the nylon of the inner layer to $ZnCl_2$.

The invention is based upon the discovery that, by the addition of at most 30% by weight of conductive carbon black or graphite fibers or fibrils to polyamide 6 (nylon 6) it is possible to make the inner layer composed of nylon 6 sufficiently conductive and also sufficiently resistant to $ZnCl_2$ to enable the use of the tubing to be highly effective for gasoline and diesel fuel for an automotive vehicle. The additives which make the inner layer conductive have been found, surprisingly, to also contribute resistance to $ZnCl_2$.

The invention is applicable not only to the nylon 6 but also the nylon 12 which does have, in the native state and prior to the addition of the conductive carbon black and/or graphite fibrils, a certain $ZnCl_2$ resistance.

According to a feature of the invention, between the outer layer and the intermediate layer of ethylene-vinyl alcohol copolymer and/or between this intermediate layer and the inner layer, respective additional layers of nylon 6 or nylon 12 can be provided which have also been rendered electrically conductive and $ZnCl_2$ resistant by the addition of at most 30% by weight of the conductive carbon black and/or the graphite fibrils. The polyamide of the layer between the outer and intermediate layers and between the intermediate and inner layers can be the same polyamide as that of the inner layer or an equivalent polyamide compound. For example, it can be polyamide 6 or a polyamide 6 compound (PA-6C).

When the polymers of the respective layers bond poorly to one another, bonding layers or polymers with an adhesive bonding characteristic or bonding promotion characteristics can be provided between them.

For example, such a bonding layer (see the aforementioned patents) can be provided between the outer layer and the next closest inner layer, i.e. the intermediate layer or a layer between the outer layer and the intermediate layer or between the inner layer and the next closest polymer layer, namely, the intermediate layer or the additional layer between that intermediate layer and the inner layer.

A suitable bonding promotion layer can be composed of polyolefins having one or more groups and especially polyethylene or polypropylene based compounds. When polyamide 12 is used for the inner layer, this layer can adjoin a bonding layer and any nylon 12 additional layer can also be in contact with one or two bonding layers and an additional layer of nylon 12 can be provided which is not electrically conductive.

The overall wall thickness of the coextruded tubing can be between 0.8 and 2.0 mm and preferably 30 to 60% of the total wall thickness can be constituted by the portion of the tubing lying outwardly of the intermediate layer. A wall thickness of the intermediate layer can be 5 to 25% of the total wall thickness and the portion of the tubing inwardly of the intermediate layer should make up 25 to 55% of the total wall thickness.

BRIEF DESCRIPTION OF THE DRAWING

The above and other objects, features, and advantages will become more readily apparent from the following description, reference being made to the accompanying drawing in which.

SPECIFIC DESCRIPTION

In all of the embodiments illustrated in accordance with the invention, the coextruded multilayer tubing, which is used as the fuel line of an automotive vehicle for gasoline or diesel fuel, comprises an outer layer 1 of nylon 12, an intermediate layer 2 of ethylene-vinyl alcohol copolymer (EVAL) forming a hydrocarbon permeation barrier and an inner layer 3 of a polyamide or nylon.

Figure 1:
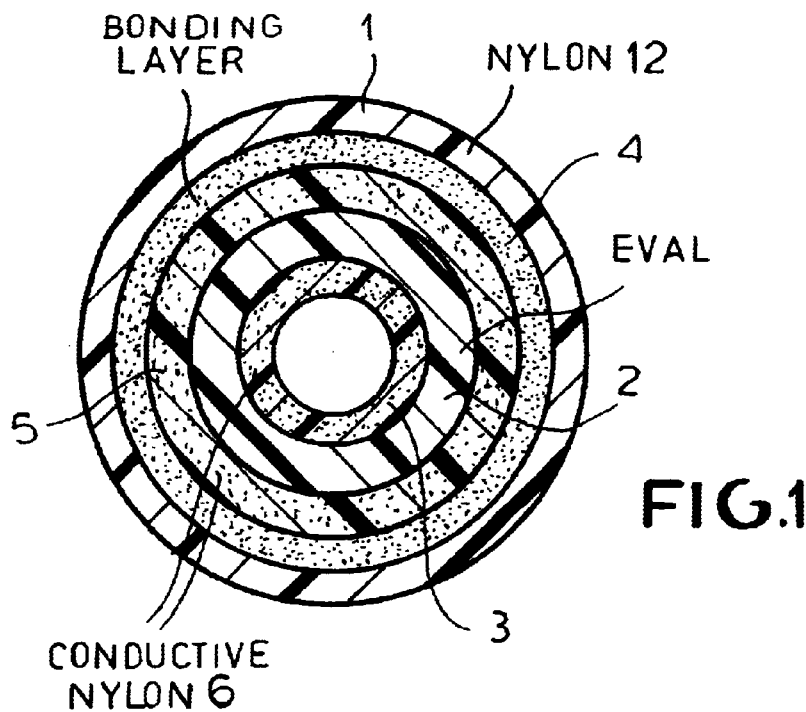
FIG. 1 is a cross sectional view through coextruded tubing for use of a fuel line for motor vehicles in which the inner layer is composed of a conductive nylon 6.
Figure 2:
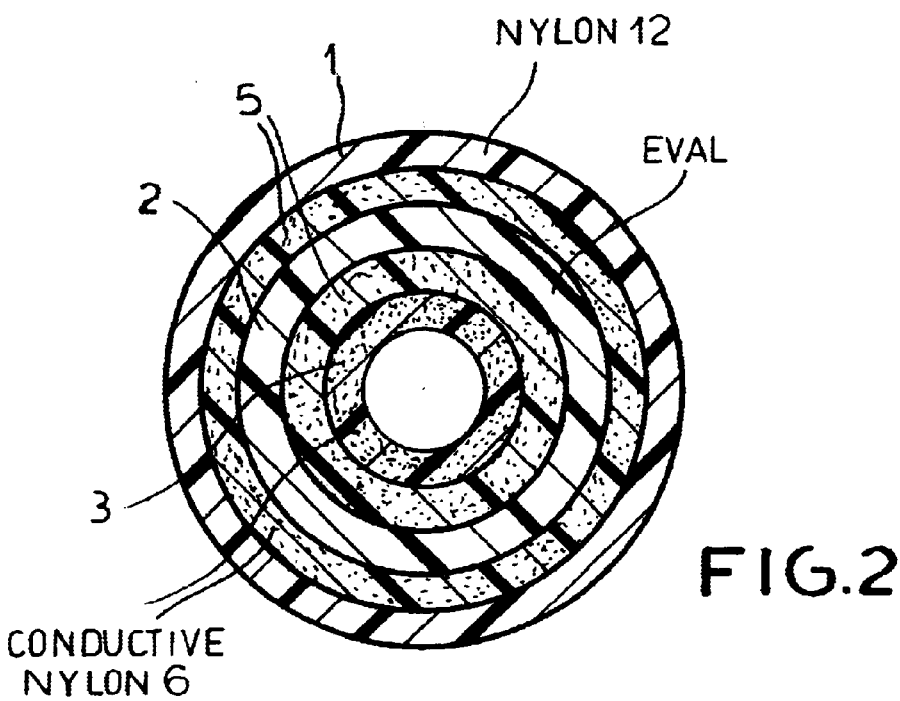
FIG. 2 is a cross section through a tubing in which the inner layer is also conductive nylon 6, and no bonding or bond promoting layer is provided.
Figure 3:
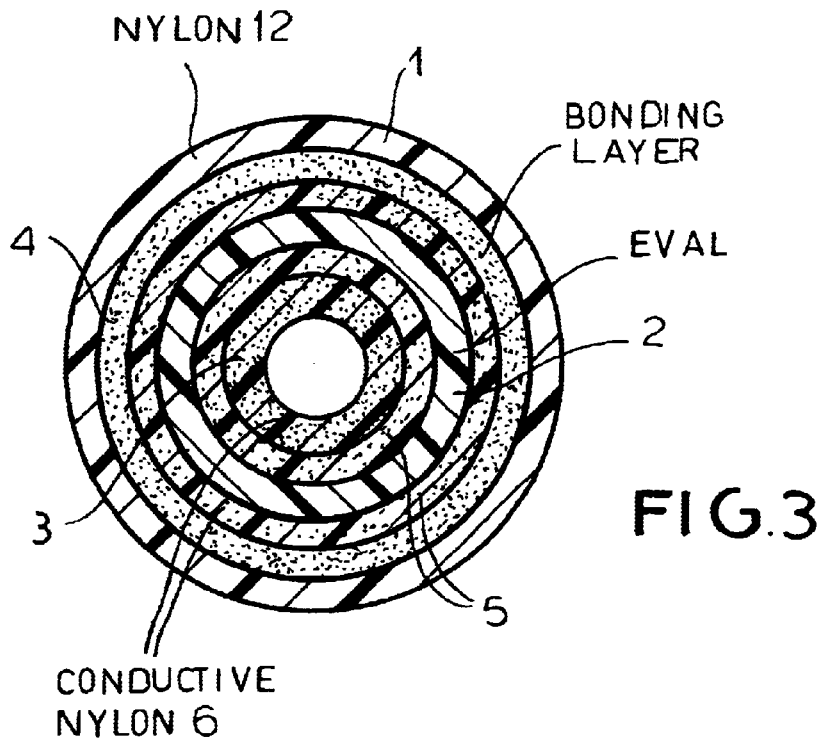
FIG. 3 is a cross section through coextruded tubing also utilizing conductive nylon 6 as the inner layer and having a bonding or bond-promoting layer.
Figure 4:
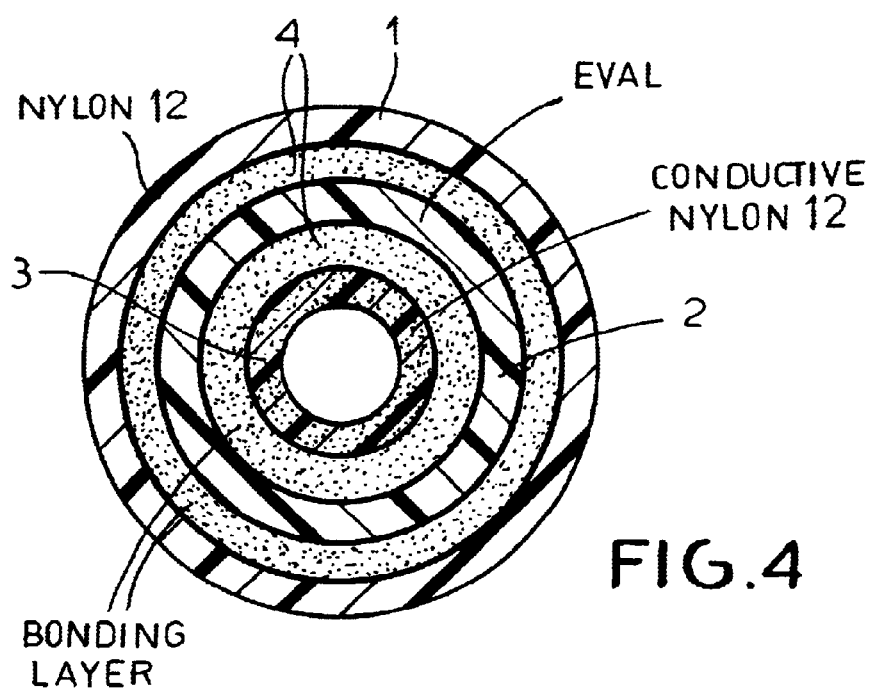
FIG. 4 is a cross sectional view through a fuel line for an automotive vehicle utilizing a conductive nylon 12 inner layer.
Figure 5:
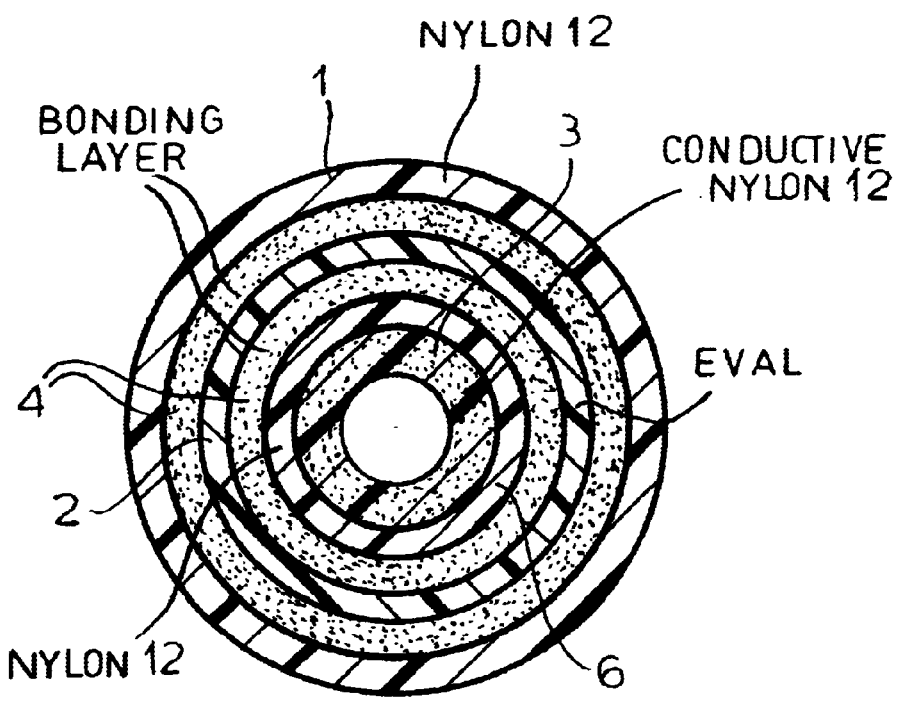
FIG. 5 is a cross sectional view through a fuel line in which an additional layer of nonconducting nylon 12 is provided directly adjoining the conductive layer.

In the embodiments of FIGS. 1–3 the inner layer is composed of nylon 6 whereas in the embodiments of FIGS. 4 and 5, it is composed of nylon 12. In each case, the inner layer is electrically conductive (PA6* or PA12*) and the conductivity is a result of the addition to the nylon of at most 30% by weight of conductive carbon black or graphite fibrils or fibers which can be of lengths ranging between 0.1 mm and 10 mm with diameters ranging between 1 micron and 1 mm. The minimum amount of the conductive additive which is required is that which will provide sufficient conductivity to the layer to dissipate an electrostatic charge and increase the $ZnCl_2$ resistance of the inner layer.

We have found that this minimum quantity is 0.1% by weight.

In the embodiment of FIG. 1, between the outer layer 1 and the intermediate layer 2, there is provided a bonding layer 4 of the polyolefin with functional groups as has been described above (see also the aforementioned patents) and an additional layer 5 which can correspond in composition to that of the inner layer, namely PA6* or electrically-conductive nylon 6.

A similar coextruded tubing is provided in FIG. 2 wherein, however, the bonding layer 4 is omitted and additional layers 5 of conductive nylon 6 or nonconductive nylon 6, i.e. the nylon 6 without the conductive additive, are provided at 5.

In particular in FIG. 2, the additional layer 5 between the outer nylon 12 layer and the intermediate layer may be a nylon 6 layer composed of polyamide 6 compound (PA6C) which may or may not be conductive. If it is electrically conductive, it contains up to 30% by weight of the conductive carbon black and/or graphite fibrils. Between the intermediate layer 2 and the inner layer 3, is a further layer 5 of PA6C or PA6 which also can be made conductive by inclusion of the conductive carbon black or graphite fibrils, but in the embodiment illustrated, is nonconductive.

In the embodiment of FIG. 3, the outer layer 1 is separated from the intermediate layer by a bonding layer 4 and an additional layer 5 of polyamide 6. In addition, between the intermediate layer 2 and the inner layer 3, there is an additional layer 5 also of nylon 6.

In FIG. 4, between the outer layer 1 and the intermediate layer 2 and between the intermediate layer 2 and the inner layer 3 are respective bond-promoting layers 4.

The tubing of FIG. 5 differs from that of FIG. 4 only in that adjacent the inner layer 3 and the bond-promoting layer 4 immediately outwardly thereof is a nonconductive nylon 12 layer 6. The wall thicknesses of the respective layers are given in the following table.

| FIG. 1 | FIG. 2 | FIG. 3 | FIG. 4 | FIG. 5 |
|---|---|---|---|---|
| 0.3 mm PA 12 | 0.3 mm PA 12 | 0.3 mm PA 12 | 0.40 mm PA 12 | 0.35 mm PA 12 |
| 0.05 mm HV | | 0.05 mm HV | 0.05 mm HV | 0.05 mm HV |
| 0.05 mm PA 6* | 0.10 mm PA 6 C | 0.05 mm PA 6 | | |
| 0.15 mm EVAL | 0.15 mm EVAL | 0.15 mm EVAL | 0.15 mm EVAL | 0.15 mm EVAL |
| | 0.35 mm PA 6 C | 0.35 mm PA 6 | 0.30 mm HV | 0.05 mm HV |
| | | | | 0.30 mm PA 12 |
| 0.45 mm PA 6* | 0.10 mm PA 6* | 0.10 mm PA 6* | 0.10 mm PA 12* | 0.10 mm PA 12* |

We claim:

1. A multilayer tubing forming a motor-vehicle fuel line for conveying a liquid comprising:

an outer layer composed of nylon 12;

an intermediate layer coextruded with said outer layer and composed of an ethylene-vinyl alcohol copolymer;

an electrically conductive inner layer coextruded with said outer and intermediate layer and composed of a nylon selected from the group which consists of nylon 6 and nylon 12 and compounded with an amount effective to render the inner layer electrically conductive and at most 30 percent by weight of at least one conductive substance selected from the group which consists of conductive carbon black and graphite fibrils, said inner layer containing at least 0.1 percent by weight of said conductive substance and sufficient to improve resistance of the nylon of said inner layer to $ZnCl_2$;

at least one bond-promoting layer between at least one of said inner and outer layers and said intermediate layer; and outwardly of said intermediate layer, at least one further nylon-containing layer.

2. The multilayer tubing defined in claim 1 where in said inner layer is a nylon 6 layer.

3. The multilayer tubing defined in claim 1 wherein said inner layer is a nylon 12 layer.

4. The multilayer tubing defined in claim 1 wherein said further nylon-containing layer is composed of the same nylon as said inner layer.

5. The multilayer tubing defined in claim 1 wherein said further nylon layer is composed of polyamide 6 compound.

6. The multilayer tubing defined in claim 4 wherein said further nylon layer is electrically conductive and contains at most 30% by weight of at least one conductive substance selected from the group which consists of conductive carbon black and graphite fibrils.

7. A multilayer tubing forming a motor-vehicle fuel line for conveying a liquid comprising:
   an outer layer composed of nylon 12;
   an intermediate layer coextruded with said outer layer and composed of an ethylene-vinyl alcohol copolymer;
   an electrically conductive inner layer coextruded with said outer and intermediate layer and composed of a nylon selected from the group which consists of nylon 6 and nylon 12 and compounded with an amount effective to render the inner layer electrically conductive and at most 30 percent by weight of at least one conductive substance selected from the group which consists of conductive carbon black and graphite fibrils, said inner layer containing at least 0.1 percent by weight of said conductive substance and sufficient to improve resistance of the nylon of said inner layer to $ZnCl_2$; and
   at least one bond-promoting layer between at least one of said inner and outer layers and said intermediate layer, at least one bond-promoting layer between said intermediate layer and said outer layer, said bond-promoting layer being composed of a polyolefin having a functional group.

8. The multilayer tubing defined in claim 7 wherein said polyolefin is polyethylene or polypropylene.

9. A multilayer tubing forming a motor-vehicle fuel line for conveying a liquid comprising:
   an outer layer composed of nylon 12;
   an intermediate layer coextruded with said outer layer and composed of an ethylene-vinyl alcohol copolymer;
   an electrically conductive inner layer coextruded with said outer and intermediate layer and composed of a nylon selected from the group which consists of nylon 6 and nylon 12 and compounded with an amount effective to render the inner layer electrically conductive and at most 30 percent by weight of at least one conductive substance selected from the group which consists of conductive carbon black and graphite fibrils, said inner layer containing at least 0.1 percent by weight of said conductive substance and sufficient to improve resistance of the nylon of said inner layer to $ZnCl_2$; and
   at least one bond-promoting layer between at least one of said inner and outer layers and said intermediate layer, at least one bond-promoting layer between said intermediate layer and said outer layer, said bond-promoting layer being composed of a polyolefin having a functional group, an additional nylon layer between said intermediate layer and said inner layer.

10. The multilayer tubing defined in claim 9 wherein said additional layer is composed of the same nylon as said inner layer.

11. The multilayer tubing defined in claim 10 wherein said additional layer is electrically conductive and contains at most 30% by weight of at least one conductive substance selected from the group which consists of conductive carbon black and graphite fibrils.

12. The multilayer tubing defined in claim 9 wherein said tubing has a total wall thickness of 0.8 to 2.0 mm.

13. The multilayer tubing defined in claim 9 wherein 30 to 60% of a total wall thickness is outwardly of said intermediate layer.

14. A multilayer tubing forming a motor-vehicle fuel line for conveying a liquid comprising:
   an outer layer composed of nylon 12;
   an intermediate layer coextruded with said outer layer and composed of an ethylene-vinyl alcohol copolymer;
   an electrically conductive inner layer coextruded with said outer and intermediate layer and composed of a nylon selected from the group which consists of nylon 6 and nylon 12 and compounded with an amount effective to render the inner layer electrically conductive and at most 30 percent by weight of at least one conductive substance selected from the group which consists of conductive carbon black and graphite fibrils, said inner layer containing at least 0.1 percent by weight of said conductive substance and sufficient to improve resistance of the nylon of said inner layer to $ZnCl_2$; and
   at least one bond-promoting layer between at least one of said inner and outer layers and said intermediate layer, the intermediate layer having a thickness of 5 to 25% of a total wall thickness of said tubing.

15. A multilayer tubing forming a motor-vehicle fuel line for conveying a liquid comprising:
   an outer layer composed of nylon 12;
   an intermediate layer coextruded with said outer layer and composed of an ethylene-vinyl alcohol copolymer;
   an electrically conductive inner layer coextruded with said outer and intermediate layer and composed of a nylon selected from the group which consists of nylon 6 and nylon 12 and compounded with an amount effective to render the inner layer electrically conductive and at most 30 percent by weight of at least one conductive substance selected from the group which consists of conductive carbon black and graphite fibrils, said inner layer containing at least 0.1 percent by weight of said conductive substance and sufficient to improve resistance of the nylon of said inner layer to $ZnCl_2$; and
   at least one bond-promoting layer between at least one of said inner and outer layers and said intermediate layer, 25 to 55% of a total wall thickness of said tubing lies inwardly of said intermediate layer.

* * * * *